US009292881B2

(12) United States Patent
Alperovitch et al.

(10) Patent No.: US 9,292,881 B2
(45) Date of Patent: Mar. 22, 2016

(54) SOCIAL SHARING OF SECURITY INFORMATION IN A GROUP

(75) Inventors: Dmitri Alperovitch, Gaithersburg, MD (US); George Robert Kurtz, Ladera Ranch, CA (US); David F. Diehl, Minneapolis, MN (US); Sven Krasser, Pasadena, CA (US); Adam S. Meyers, Washington, DC (US)

(73) Assignee: CrowdStrike, Inc., Irvine, CA (US)

( * ) Notice: Subject to any disclaimer, the term of this patent is extended or adjusted under 35 U.S.C. 154(b) by 11 days.

(21) Appl. No.: 13/538,439

(22) Filed: Jun. 29, 2012

(65) Prior Publication Data

US 2014/0007190 A1      Jan. 2, 2014

(51) Int. Cl.
| | | |
|---|---|---|
| G06F 21/00 | (2013.01) | |
| G06Q 50/00 | (2012.01) | |
| H04L 29/06 | (2006.01) | |
| G06Q 10/00 | (2012.01) | |

(52) U.S. Cl.
CPC .............. *G06Q 50/01* (2013.01); *H04L 63/104* (2013.01); *H04L 63/1441* (2013.01); *G06Q 10/00* (2013.01)

(58) Field of Classification Search
CPC ... G06F 21/00; G06F 21/604; G06F 21/6218; G06F 21/6227; G06F 21/6272; G06F 2221/2113; G06F 2221/2115; G06F 2221/2117; G06F 2221/2119; G06F 2221/2141; G06F 2221/2143; G06F 2221/2145; G06F 2221/2149; G06F 17/30; G06F 17/30994; H04L 63/20; H04L 63/1408; H04L 63/126; H04L 63/1441; H04L 63/104; G06Q 50/01

USPC ........... 726/1–3; 709/221, 225, 229; 713/150, 713/176; 707/999.107; 380/44
See application file for complete search history.

(56) References Cited

U.S. PATENT DOCUMENTS

| | | | |
|---|---|---|---|
| 6,088,804 | A | 7/2000 | Hill et al. |
| 7,478,237 | B2 | 1/2009 | Costea et al. |
| 7,765,400 | B2 | 7/2010 | Costea et al. |
| 7,765,410 | B2 | 7/2010 | Costea et al. |
| 7,890,664 | B1 | 2/2011 | Tao et al. |
| 8,065,728 | B2 | 11/2011 | Wang et al. |
| 8,234,693 | B2 * | 7/2012 | Stahl et al. ........................ 726/4 |
| 8,321,677 | B2 * | 11/2012 | Morten .......................... 713/176 |

(Continued)

FOREIGN PATENT DOCUMENTS

| | | |
|---|---|---|
| KR | 1020100085424 A | 7/2010 |
| KR | 101038048 | 6/2011 |

(Continued)

OTHER PUBLICATIONS

PCT Search Report and Written Opinion mailed Sep. 17, 2013 for PCT application No. PCT/US2013/040420, 12 pages.

(Continued)

*Primary Examiner* — Thanhnga B Truong
(74) *Attorney, Agent, or Firm* — Lee & Hayes, PLLC

(57) ABSTRACT

Techniques for social sharing security information between client entities forming a group are described herein. The group of client entities is formed as a result of a security server providing one or more secure mechanisms for forming a group among client entities, the client entities each belonging to a different organization. The security service then automatically shares security information of a client entity in the group with one or more other client entities in the group.

32 Claims, 6 Drawing Sheets

(56) References Cited

U.S. PATENT DOCUMENTS

| | | | |
|---|---|---|---|
| 8,407,279 B2* | 3/2013 | Kang | 709/202 |
| 8,539,584 B2 | 9/2013 | Ramalingam | |
| 8,572,247 B2* | 10/2013 | Larson et al. | 709/225 |
| 8,577,616 B2* | 11/2013 | Dunlap | 702/19 |
| 8,578,477 B1 | 11/2013 | Lin et al. | |
| 8,762,298 B1 | 6/2014 | Ranjan et al. | |
| 8,776,227 B1 | 7/2014 | Glick et al. | |
| 9,043,903 B2 | 5/2015 | Diehl et al. | |
| 2002/0023211 A1 | 2/2002 | Roth et al. | |
| 2006/0174323 A1* | 8/2006 | Brown et al. | 726/3 |
| 2007/0022287 A1 | 1/2007 | Beck et al. | |
| 2007/0094496 A1 | 4/2007 | Burtscher | |
| 2007/0143850 A1 | 6/2007 | Kraemer et al. | |
| 2007/0250817 A1 | 10/2007 | Boney | |
| 2008/0034429 A1 | 2/2008 | Schneider | |
| 2008/0189796 A1 | 8/2008 | Linn et al. | |
| 2008/0209505 A1 | 8/2008 | Ghai et al. | |
| 2008/0253287 A1 | 10/2008 | Gupta et al. | |
| 2008/0282198 A1 | 11/2008 | Brooks et al. | |
| 2009/0070878 A1 | 3/2009 | Wang et al. | |
| 2009/0119681 A1 | 5/2009 | Bhogal et al. | |
| 2009/0216806 A1* | 8/2009 | Feuerstein et al. | 707/104.1 |
| 2010/0074446 A1 | 3/2010 | Fuchs et al. | |
| 2010/0169973 A1 | 7/2010 | Kim et al. | |
| 2010/0235622 A1 | 9/2010 | Robinton et al. | |
| 2010/0312890 A1 | 12/2010 | Bernosky | |
| 2011/0029772 A1 | 2/2011 | Fanton et al. | |
| 2011/0099632 A1 | 4/2011 | Beck et al. | |
| 2011/0209219 A1 | 8/2011 | Zeitlin et al. | |
| 2011/0239306 A1 | 9/2011 | Avni et al. | |
| 2012/0005542 A1 | 1/2012 | Petersen et al. | |
| 2012/0167161 A1 | 6/2012 | Kim | |
| 2012/0246297 A1 | 9/2012 | Shanker et al. | |
| 2012/0255012 A1 | 10/2012 | Sallam | |
| 2013/0291112 A1 | 10/2013 | Shue et al. | |
| 2013/0312095 A1 | 11/2013 | Edwards et al. | |
| 2013/0333040 A1 | 12/2013 | Diehl et al. | |
| 2014/0109226 A1 | 4/2014 | Diehl et al. | |
| 2015/0244679 A1 | 8/2015 | Diehl et al. | |
| 2015/0268947 A1 | 9/2015 | Ionescu | |
| 2015/0326614 A1 | 11/2015 | Alperovitch et al. | |

FOREIGN PATENT DOCUMENTS

| | | |
|---|---|---|
| WO | WO2012107557 | 8/2012 |
| WO | WO2012135192 | 10/2012 |
| WO | WO2013164821 | 11/2013 |

OTHER PUBLICATIONS

PCT Search Report and Written Opinion mailed Sep. 26, 2013 for PCT application No. PCT/US13/40428, 13 pages.

Office Action for U.S. Appl. No. 13/728,746, mailed on Apr. 14, 2014, David F. Diehl, "Real-Time Representation of Security-Relevant System State", 17 pages.

Office Action for U.S. Appl. No. 13/492,672, mailed on Apr. 7, 2014, David F. Diehl, "Kernel-Level Security Agent", 8 pages.

King et al, "Backtracking Intrusions", ACM SOSP, Oct. 2003, vol. 37, Issue 5, 14 pgs.

PCT Search Report and Written Opinion mailed Apr. 29, 2014 for PCT application No. PCT/US13/75856, 13 pages.

Final Office Action for U.S. Appl. No. 13/492,672, mailed on Oct. 23, 2014, David F. Diehl, "Kernel-Level Security Agent", 15 pages.

Final Office Action for U.S. Appl. No. 13/728,746, mailed on Dec. 3, 2014, David F. Diehl, "Real-Time Representation of Security-Relevant System State", 22 pages.

Office Action for U.S. Appl. No. 14/140,323, mailed on Jul. 31, 2015, David F. Diehl, "Kernel-Level Security Agent", 9 pages.

PCT Search Report and Written Opinion mailed Apr. 28, 2015 for PCT application No. PCT/US2015/013522, 13 pages.

PCT Search Report and Written Opinion mailed Jun. 1, 2015 for PCT application No. PCT/US2015/020187, 13 pages.

Translated Singapore Office Action mailed Sep. 28, 2015 for Singapore patent application No. 11201407292Q, a counterpart foreign application of U.S. Pat. No. 9,043,903, 6 pages.

Supplementary European Search Report mailed Nov. 3, 2015 for European Patent Application No. 13800519.4, 7 pages.

Translated Singapore Office Action mailed Nov. 17, 2015 for Singapore patent application No. 11201408279Q, a counterpart foreign application of U.S. Appl. No. 13/538,439, 6 pages.

Partial Supplementary European Search Report mailed Jan. 25, 2016 for European Patent Application No. 13808592.3, 6 pages.

* cited by examiner

SOCIAL SHARING OF SECURITY INFORMATION IN A GROUP

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

Often, organizations and individuals experience these threats without any knowledge of others experiencing the same threats. An attack on one company is dealt with by that company alone, and others do not learn from that company's experience or leverage its solution.

Occasionally, those suffering an attack will publicly share their experience and solution or will share such information with a select few, such as customers or subsidiaries. This sharing of information occurs manually, however, under the direction or security or information technology personnel of the affected party. Such personnel may retrieve and share log files, file names, hashes, new policies, etc. through electronic mail, file transfer, or other technology. Personnel at a receiving entity must then manually apply any received solutions or craft solutions based on received information.

In this cyber ecosystem of security islands, then, adversaries are free to attack each entity without any concern about true concerted efforts among affected entities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for forming groups of entities and automatically sharing security information of the entities belonging to a group with each other. The security information may include one or more of threat information, remediation information, attack data, vulnerability information, reverse engineering information, packet data, network flow data, protocol descriptions, victim information, threat attribution information, incident information, proliferation data, user feedback, information on systems and software, or policies. The entities may be organizations, such as businesses, academic institutions, or governmental entities, or may be individuals or groups of individuals. Each entity is associated with one or more computing devices, and each computing device may include an agent that serves as a client to a security service. Further, each entity may be able to impose a security scheme or policy on its computing device(s) but unable to impose or enforce a security scheme or policy on the computing device(s) of other entities. The agents may observe and act on execution activities of their respective computing devices and may generate security information based on the observed execution activities. It is this generated security information that is provided to the security service and automatically shared with agents of computing devices of other entities that belong to a group including the entity whose agent provided the security information. Because these entities receive services from the security service, they are referred to herein as "client entities." The security service may either be a public security service open to interested client entities or a private security service open only to specific, select client entities.

Figure 1A:
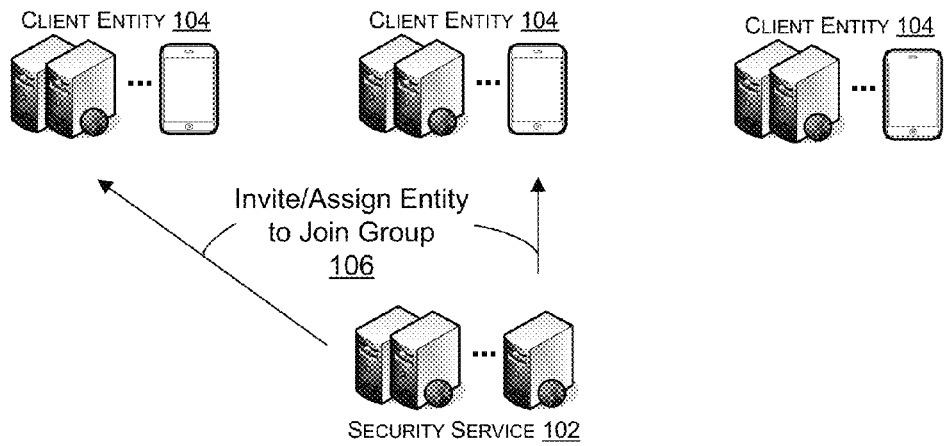
FIGS. 1a-1b illustrates an overview of a security service that provides secure mechanisms for forming client entities into groups and that automatically shares security information among the client entities of a group.

As illustrated in FIG. 1a, the security service, such as security service 102, may create the groups for the client entities, such as client entities 104, using any of a number of secure mechanisms. In some embodiments, the security service 102 may determine that a number of client entities 104 are currently experiencing or are likely to experience a security threat and, in response, may create a group for those client entities 104 and either invite 106 the affected client entities 104 to join the group or assign 106 those client entities 104 to the group while providing them with an option to opt out of the group.

In some embodiments, the security service 102 may create a group associated with one or more of an industry sector, a geographic location, an entity size (e.g., number of employees), or an interest, preference, or setting of client entities 104. The security service 102 may then invite 106 client entities 104 associated with that industry sector, geographic location, entity size, interest, preference, or setting to join the group, may assign 106 the client entities 104 to the group with an option to opt out of the group, or may open the group to the public, enabling client entities 104 to discover the group and elect to join it.

In further embodiments, the security service 102 may create a group of client entities 104 with complementary behaviors. For example, one client entity 104 may be better at remedying threats, and another client entity 104 better at developing policies that prevent successful intrusions. The security service 102 could create a group for such entities 104 with complementary strengths and either invite 106 the client entities 104 to join or assign 106 the client entities 104 to the group with an option to opt out.

In some embodiments, the security service 102 may create a group of client entities 104 based on an existing social network group. The social network group and identities of its members may be obtained from a social network and the security service 102 may generate a corresponding group of client entities 104. The security service 102 may then invite 106 the client entities 104 to join the group or assign 106 the client entities 104 to the group with an option to opt out.

In various embodiments, the security service 102 may also enable the client entities 104 to either create a group or invite other client entities 104 to join an existing group. The security service 102 may enable a client entity 104 to provide a unique identifier of another client entity 104 and, in response, invite that other client entity 104 to join a group with the providing client entity 104. The unique identifier may be a one-time identifier, unique to that invitation. The security service 102 may also provide a search mechanism that enables a client entity 104 to identify another entity. The search mechanism may enable the client entity 104 to search for and receive a list of client entities 104 that are viewable by the searching client entity 104 and selectable to invite to join groups or form groups. Also or instead, the search mechanism may be or include a blind search mechanism. With a blind search mechanism, the searched-for client entity is not viewable by the searching client entity and the searching client entity receives no responsive indication of whether or not the search was successful. If that other entity is also a client entity 104 of the security service 102, the security service may then invite the other entity to join a group with the searching client entity 104. In some embodiments, to security service 102 performs the inviting conditionally based on whether the searched-for client entity 104 has ever searched for the searching client entity 104 before.

In some embodiments, the groups may be hierarchically-related or bi-directionally-related through one or more hierarchies or bi-directional relationships. For example, parent company's group may be hierarchically-related to a subsidiary's group, or a group for one entity may be bi-directionally-related to another entity that the group does business with. These hierarchical/bi-directional relations may impact which groups a client entity is allowed to join (e.g., a client entity associated with a parent company may only join a group associated with a subsidiary if the client entity belongs to a group for the parent company) as well as the sharing of security information. For example, a client entity 104 setting policy for its group may push that policy upon client entities 104 of a lower group in a hierarchy of groups or of a lateral group in a bi-directional relationship. In another example, the hierarchical relationship between two groups may impose access controls, allowing a group lower in a hierarchy access to a subset of the security information available to a group higher in the hierarchy.

Figure 1B:
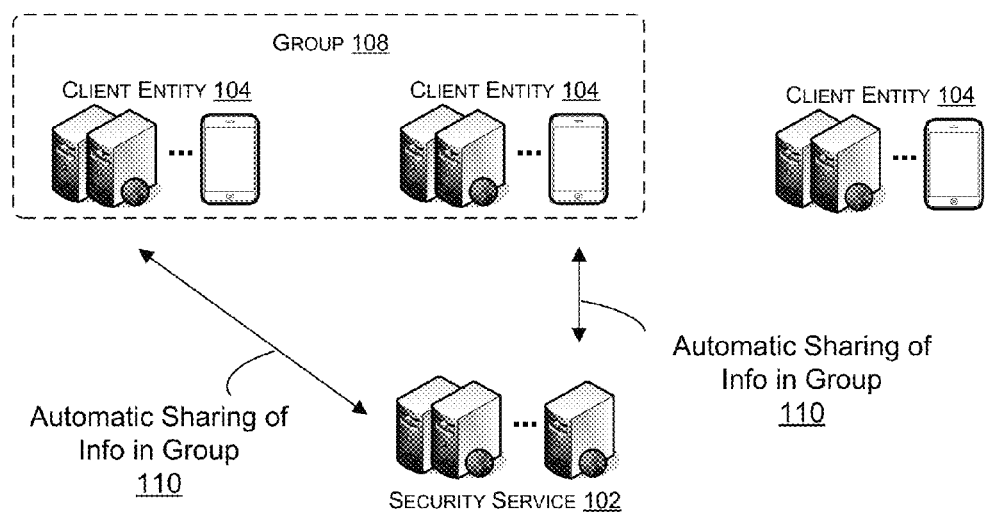

In FIG. 1*b*, the security service 102 may also enable client entities to set group preferences or group parameters for sharing or policies among client devices 104 of a group 108. The member client entities 104 of the group 108 may then have their security information automatically shared 110 with other member client entities 104 of the group 108 in accordance with those group preferences or group parameters. Further, in some embodiments, a client entity 104 may manually share security information with another client entity 104, asking the security service 102 to provide its security information to the other client entity 104.

Further, the security service 102 may enable a client entity 104 to set system-wide preferences or parameters for sharing or policies. These preferences or parameters provide client entities 104 with the ability to control at a fine granularity the information that they share with others. Further, client entities 104 may have profile pages provided by the security service 102 to other group members 104 or to the public, and the client entities 104 associated with those profile pages may be enabled to control who sees their associated pages and how much of the pages can be seen by those with viewing access.

In various embodiments, the security service 102 may also associate a rating or point currency with each client entity 104. Such ratings or point currencies may be system-wide or group-based. In some embodiments, a client entity 104 may have multiple ratings and point currencies associated with both the system and with one or more specific groups 108. The security service 102 may enable other client entities 104 to affect a rating or point currency of a client entity 104 in their groups 108, increasing or decreasing that rating or point currency. Further, the security service 102 may adjust a rating or point currency of a client entity 104 based on actions taken or refrained from by the client entity 104. In some embodiments, in addition to or in place of the ratings and point currencies, the security service 102 may award merit indicia to a client entity 104 based on contributions of the client entity 104 to a security ecosystem of the security service 102 or to the group 108.

Example Network and Devices

Figure 2:
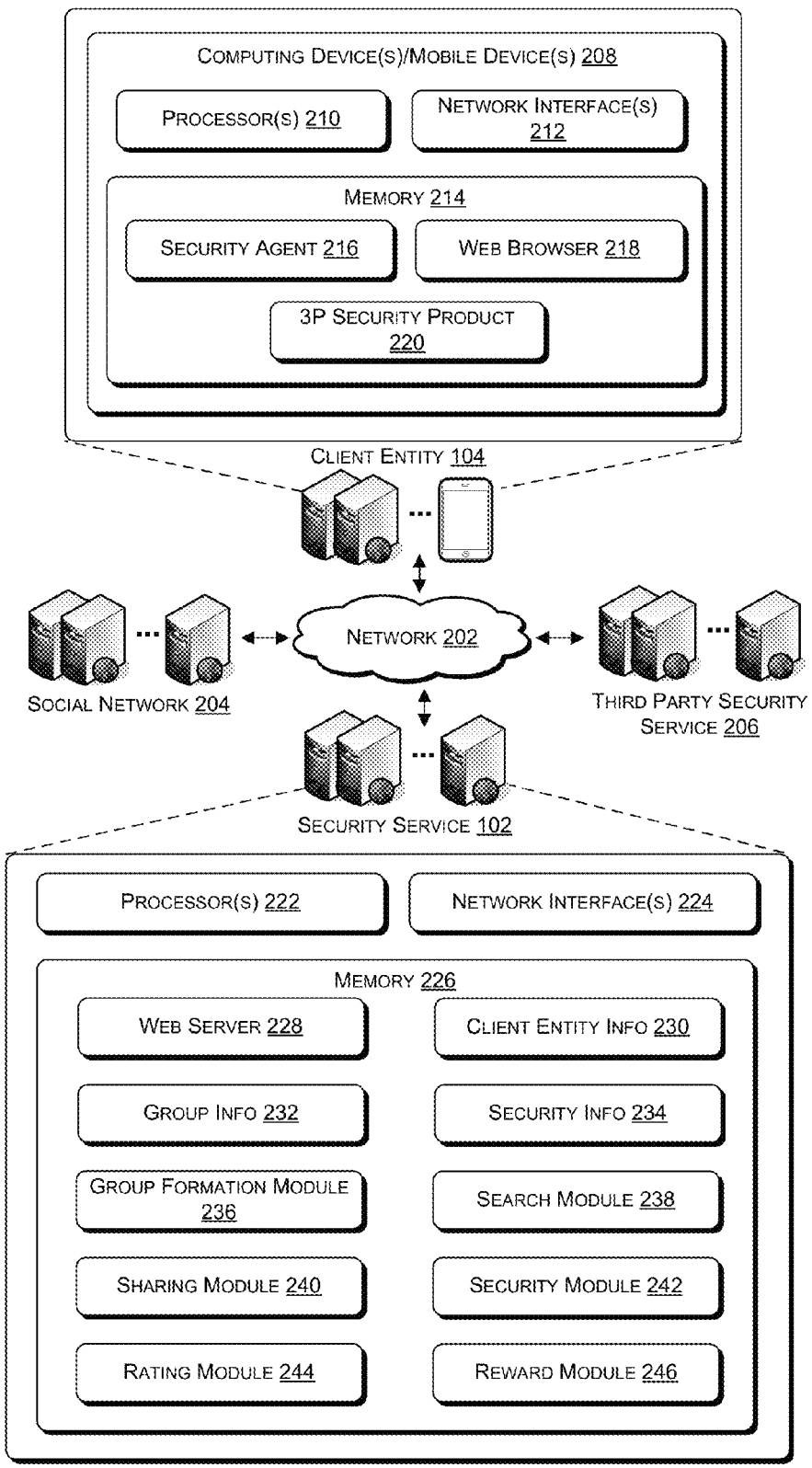
FIG. 2 illustrates an example network connecting a security service with a plurality of client entities and example devices of the security service and client entities.

FIG. 2 illustrates an example network connecting a security service with a plurality of client entities and example devices of the security service and client entities. As illustrated in FIG. 2, a security service 102 may communicate with client entities 104 over a network 202. The security service 102 and client entities may also communicate with a social network 204 and a third party security service 206 over the network 202. Each client entity 104 may have one or more computing devices/mobile devices 208, and each computing device may have processor(s) 210, network interface(s) 212, and memory 214. The memory 214 may store a kernel-level security agent 216, a web browser 218, and a third party security product 220.

In various embodiments, devices of the security service 102 may include processor(s) 222, network interface(s) 224, and memory 226. The memory 226 may store a web server 228, client entity information 230, group information 232, threat, remediation, and policy information 234, a group formation module 236, a search module 238, a sharing module 240, a security module 242, a rating module 244, and a reward module 246.

In various embodiments, the computing devices of the security service 102 and the computing device/mobile device 208 of the client entities 104 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing devices of the security service 102 represent a plurality of computing devices working in communication, such as a cloud computing network of nodes. When implemented on multiple computing devices, the security service 102 may distribute the modules and data 228-246 of the security service 102 among the multiple computing devices. In some implementations, one or more of the computing devices of the security service 102 and the computing device/mobile device 208 of the client entities 104 represents one or more virtual machines implemented on one or more computing devices.

In some embodiments, the network 202 connecting these computing devices of the security service 102 and the computing device/mobile device 208 of the client entities 104 may be include any one or more networks, such as wired networks, wireless networks, and combinations of wired and wireless networks. Further, the network 202 may include any one or combination of multiple different types of public or private networks (e.g., cable networks, the Internet, wireless networks, etc.). In some instances, the security service 102, the client entities 104, the social network 204, and the third party security service 206 communicate over the network using a secure protocol (e.g., https) and/or any other protocol or set of protocols, such as the transmission control protocol/Internet protocol (TCP/IP).

The security service 102 may be a provider of information security services to client entities 104, such as forming groups of those client entities 104 and automatically sharing security information among the client entities 104 constituting a group. In some embodiments, the security service 102 may also provide other security services, such as maintenance and configuration of the kernel-level security agents 216, threat modeling, and/or remediation. As mentioned above, the client entities 104 may be organizations, such as businesses, academic institutions, or governmental entities, or may be individuals or groups of individuals which subscribe to or otherwise receive the security services of security service 102.

As illustrated in FIG. 2, the network 202 may also connect the security service 102 and computing devices/mobile devices 208 of client entities 104 to one or both of a social network 204 and/or a third party security service 206. The social network 204 may be any of a number of personal or professional social network sites and may provide those with accounts with the sites with the ability to create groups. Such groups may facilitate personal or professional networking activities. In some embodiments, the social network 204 may export or otherwise provide lists of members of a group to the security service 102 or client entities 104 which may then be used by the security service 102 in forming the groups of client entities 104 that share security information.

The third party security service 206 may be any sort of security service, such as a provider of antivirus software. The third party security service 206 is separate and distinct from the security service 102 and client entities 104. The security service 102 may receive security information from such third party security services 206 and may provide them, in return, with security information received from client entities. The security service 102 may then provide the groups of client entities 104 with the security information received from the third party security service 206.

As mentioned, the computing device(s)/mobile device(s) 208 include processor(s) 210 and network interface(s) 212. The processor(s) 210 may be or include any sort of processing unit, such as a central processing unit (CPU) or a graphic processing unit (GPU). The network interface(s) 212 allow the computing device(s)/mobile device(s) 208 to communicate with one or both of the security service 102, other client entities 104, the social network 204, third party security services 206, and other devices. The network interface(s) 212 may send and receive communications through one or both of the network 202 or other networks. The network interface(s) 212 may also support both wired and wireless connection to various networks.

The memory 214 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In various embodiments, the security agent 216 may be a kernel-level security agent that observes and acts upon execution activities of its corresponding computing device/mobile device 208. The security agent 216 may be configurable by the security service 102, receiving, and applying while live, reconfigurations of filters, components, models, etc. of the security agent 216. Based on the observed execution activities, the security agents 216 may generate security information which the security agent 216 may act upon and provide to other security agents 216 of the same client entity 104 and of other client entities 104 in a group with the client entity 104 of the security agent 216. The security agent may share the security information through the security service 102. Also, the security agent may receive and apply security information of other security agents 216 and may continue to observe and act upon execution activities based on the security information received from the other security agents 216. The security agents 216 may then act in parallel with respect to each other, sharing security information and thus observing and acting more thoroughly and promptly than they would if such sharing did not occur. An example security agent 216 is described in greater detail in U.S. patent application Ser. No. 13/492,672, entitled "Kernel-Level Security Agent" and filed on Jun. 8, 2012.

In some embodiments, the web browser 218 is any sort of web browser and may receive web content from any of a number of web servers, including the web server 228 of the security service 102. The web browser 218 may receive and display web pages that include a plurality of user interface control elements, such as forms, fields, buttons, etc. through which a user of the web browser 218 can provide information. Such information can include consent to join a group, preferences and parameters, etc. Some example user interfaces delivered through the web browser 218 are described below with reference to the web server 228.

In further embodiments, the third party security product 220 may be any sort of a security product, such as antivirus software, that scans its corresponding computing device/mobile device 208 for viruses or other exploits. The third party security product 220 may receive information, such as virus definitions, from the third party security service 206. In some embodiments, the third party security product 220 may also receive security information from the security agent 216 or from the security service 102.

As mentioned, the devices of the security service 102 include processor(s) 222 and network interface(s) 224. The processor(s) 222 may be or include any sort of processing units, such as central processing units (CPU) or graphic processing units (GPU). The network interface(s) 224 allow the devices of the security service 104 to communicate with one or both of the devices of the client entities 104, the device(s) of the social network 204, the device(s) of the third party security services 206, and other devices. The network interface(s) 224 may send and receive communications through one or both of the network 202 or other networks. The network interface(s) 224 may also support both wired and wireless connection to various networks.

The memory 226 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In various embodiments, web server 228 may be any sort of web server. Web server 228 may serve static or dynamic web pages that include graphic, textual, and control/form elements constructed by a presentation language (e.g., Hypertext Markup Language (HTML)), a scripting language (e.g., EMCAScript), or a server-side programming language (e.g., C++). The web pages may also be connected to, pull data from, and write data to one or more data sources, such as repositories of client entity information 230 or group information 232, or any files or databases of the security service 102.

The web server 228 may first serve a log-in/sign-up page to a client entity 104, requiring the client entity 104 to sign-up for an account/profile with the web server 228 of the security service 102 and to log into that account/profile before receiving further information via web pages served by the security service 102. In some embodiments, only certain persons associated with a client entity 104 may be able to log into or sign-up with the web server 228. These persons may be identified when the client entity 104 acquires the security agent(s) 216 or at some other time. In other embodiments, any person at a client entity 104 may sign up with the web server 228, and acquisition of security agents 216 and specification of users with access to log into the web server 228 may follow such a sign up.

In some embodiments, upon a client entity 104 logging into the web site delivered by the web server 102, the web server 228 may deliver a home page or other landing page (e.g., a last visited page) to the client entity 104. The home page or landing page may be or include link(s) to a profile page for the client entity 104, a page for a group that a client entity 104 belongs to, a page with links to group pages or profile pages of other client entities, or a settings page for the client entity 104 groups or for the client entity 104 itself. In addition, the home page or landing page may include fields to input unique identifiers of other client entities or a search field to input information identifying an entity or a search query describing an entity or number of entities. Such fields may enable a client entity 104 to invite another client entity 104 to join a group or form a group with the client entity 104. In one embodiment, the fields be associated with existing groups (e.g., a drop down box listing groups that the client entity 104 is a member of placed next to a text entry field for the unique identifier or search) to enable the invitation to be for a specific group. The home or landing page may also include a search field allowing the client entity 104 to search for public groups, semi-public groups (groups public to those fitting certain criteria), or other groups that the security service has identified as being available to the client entity 104. Further, in some embodiments, the home page or landing page may include representations of security information available from another client entity 104 (whose identity may or may not be concealed) in exchange for the client entity 104 receiving the home page providing its security information to the other client entity 104. The available security information may be selected to represent to the client entity 104 based on security information possessed or provided by the client entity 104. For example, the client entity 104 may be viewing or using certain security information, and the security service 102 may, in response, select security information associated with the security information being viewed or used to represent to the client entity 104.

The web server 228 may provide each client entity with a profile page and associated settings page. The profile page may display information relevant to the client entity 104, such as security information obtained from the client entity, recommendations, etc. The profile page may also display a rating or point currency for the client entity 104 and any merit indicia, such as badges, etc., provided to the client entity for the contributions it has made (e.g., attributing malware to an adversary). The client entity 104 may use the settings page to control what information on the profile page is viewable by group members of the groups that the client entity belongs to and information that is viewable by other client entities of the security service 102 (i.e., the security ecosystem formed by a "public" constituted of all the client entities 104 of the security service 102). For example, the client entity 104 may elect to only have its rating, merit indicia, and a general description (industry sector, location, size, etc.) viewable to other client entities 104. Also, the client entity 104 may specify preferences that indicate the sorts of groups it would be interested in joining. For example, the settings page could display a list of characteristics (location, size, industry sector) that the client entity 104 can select among. Such preferences can be utilized by the security service 102 in forming groups. In addition, the client entity 104 may be enabled by the settings page to adjust parameters, such as sharing parameters or policy parameters, which allows the client entity 104 to determine the granularity of the information that it shares.

In further embodiments, the web server 228 may provide a group page for each group that is accessible by member client entities, as well as an associated settings page for that group. The group page may display information relevant to the member client entities 104, such as security information obtained from the client entities, recommendations, etc. The group page may also display a list of the member client entities 104 and an identification of a characteristic associated with the group (e.g., shared threat, common member characteristic, etc.). Also, the group page may show a rating, point currency, or merit indicia associated with each member. The associated settings page for the group may enable the group members to specify parameters for the group, such as sharing or policy parameters, which may be binding on group members.

In various embodiments, the client entity information 230 may be stored in one or more files, databases, or other repositories of the security service 102. The client entity information 230 may include information descriptive of the associated client entity 104. For example, the client entity information 230 may include descriptive information provided when registering the client entity 104 for the security service 102 or at a later time, such as an industry sector of the client entity 104, a geographic location of the client entity 104, an entity size (e.g., number of employees), interests and preferences, etc. The client entity information 230 may also include a view of security information 234 that is associated with the client entity 104. Further, the client entity information 230 may include setting for accessibility of the profile page of the client entity 104, a list of preferences indicative of groups the client entity 104 would be interested in joining, and settings for parameters governing the sharing of client entity threat, remediation, and policy information. Additionally, the client entity information 230 may include a list of groups that the client entity 104 is associated with, as well as ratings, point currencies, or merit indicia that are specific to those groups or to the system as a whole.

In some embodiments, the group information 232 may be stored in one or more files, databases, or other repositories of the security service 102. The group information 232 may include information descriptive of associated groups of client entities 104. For example, the group information 232 may include a list of client entities 104 associated with the group and an identification of a characteristic associated with the group (e.g., shared threat, common member characteristic, etc.). The group information 232 may also include a view of security information 234 that is associated with a group of client entities 104. Also, the group information 232 may include settings for sharing and policy parameters that govern the sharing of client entity security information, and settings governing the exposure of client entity identities to the group. For instance, the group settings may allow member client entities 104 to be anonymous with respect to other members of the group or may require that client entities 104 identify themselves. The group settings may also specify a member client entity 104 or member client entities 104 as a trusted moderator or group of moderators that has the power to control admission to the group.

In further embodiments, the security information 234 may include a wide range of security data received from the client entities 104 and from third party security services 206. The security information 234 may include one or more of threat information, remediation information, attack data, vulnerability information, reverse engineering information, packet data, network flow data, protocol descriptions, victim information, threat attribution information, incident information, proliferation data, user feedback, information on systems or software, or policies. More specifically, the security information 234 may include signatures, patterns, indicators, hashes, file names, execution activity chains, log files, remediation instructions, security policies, and any other sort of security data and information. The security information 234 may be received by the security service 102 from security agents 216 of client entities and stored in one or more files, databases or repositories of the security service 102. The security service 102 may perform analysis on the security information 234 and develop configuration updates or remediation instructions for the security agents 216 based on the security information 234. The security information 234 may also be utilized by the sharing module 240 for automatic sharing among members of groups that include the client entity 104 which provided the security information 234.

In various embodiments, the group formation module 236 may be any one or more applications, processes, threads, algorithms or modules capable of being executed by a processor to create groups and invite or assign client entities 104 to be members of those groups. In some embodiments, the security service 102 may determine the occurrence of a threat based on the security information 234 and may invoke the group formation module 236, notifying the group formation module 236 of the threat and of the client entities experiencing or likely to experience that threat. In response, the group formation module 236 may create a group open to or composed of those threatened client entities. This may involve augmenting the group information 232 with information describing the new group. The group formation module 236 may then invite the designated entities 104 to join the group or assign those client entities 104 to the group while providing them with an option, through a web page served by web server 228, to opt out of the group.

In further embodiments, the group formation module 236 may create a group based on client entity characteristics or preferences. For example, the group formation module 236 may create a group that includes client entities 104 having a same or related industry sector, geographic location, entity size, etc. This may involve augmenting the group information 232 with information describing the new group. The group formation module 236 may then invite the client entities 104 associated with the characteristic or preference to join the group or assign those client entities 104 to the group while providing them with an option, through a web page served by web server 228, to opt out of the group.

In some embodiments, the group formation module 236 may determine client entities 104 with complementary behaviors based on the security information 234. For example, one client entity 104 may be better at identifying intrusions, and another at developing policies that frustrate intrusions. The group formation module 236 may then create a group between such client entities 104 and either invite the client entities 104 to join the group or assign those client entities 104 to the group while providing them with an option, through a web page served by web server 228, to opt out of the group. The group formation module 236 may also augment the group information 232 with information describing the new group.

In further embodiments, the group formation module 236 may retrieve group lists from the social network 204 that describe existing groups on the social network 204. The group formation module 236 may create a corresponding group and augment the group information 232 with information describing the new group. The group formation module 236 may then invite the client entities 104 to join the group or assign those client entities 104 to the group while providing them with an option, through a web page served by web server 228, to opt out of the group.

In various embodiments, the group formation module 236 may be invoked by the web server 228 upon a client entity 104 entering a unique identifier or search query in a field of a web page served by the web server 228. If a unique identifier, the group formation module 236 may determine a client entity 104 associated with the unique identifier and invite that client entity 104 to join the group or assign those client entities 104 to the group while providing them with an option, through a web page served by web server 228, to opt out of the group. The group formation module 236 may determine a client entity 104 associated with the unique identifier by, for example, referencing the client entity information 230.

If a search query, the group formation module 236 may invoke the search module 238 and provide the search query to the search module 238. If the search query is associated with a client entity 104, the group formation module 236 may invite that client entity 104 to join the group or assign those client entities 104 to the group while providing them with an option, through a web page served by web server 228, to opt out of the group.

In some embodiments, the search module 238 may be any one or more applications, processes, threads, algorithms or modules capable of being executed by a processor to determine whether an entity specified in a search query is a client entity 104 and/or to determine whether any client entities 104 that are viewable by the searching client entity 104 match a search query. The search module 238 may be invoked by the group formation module 238, as mentioned above, and may, for example, compare the search query to the client entity information 230 to determine if a matching client entity 104 can be found. If a match can be found, the search module 238 may notify the group formation module 236 of the match. In further embodiments, the search module 238 may also receive search queries seeking available groups from the web server 228. In response to receiving such queries, the search module 238 may search the group information 232 to determine if there are groups that match the query and that are open to the searching client entity 104. The search module 238 may then return the matching groups to the web server 228 for display to the searching client entity 104.

In various embodiments, the sharing module 240 may be any one or more applications, processes, threads, algorithms or modules capable of being executed by a processor to automatically share security information 234 provided by one client entity 104 with other client entities 104 belonging to a group that include the providing client entity 104. The sharing module 240 may perform the automatic sharing in accordance with group parameters specifying the security information 234 that should be shared and/or in accordance with client entity parameters/settings. The sharing module 240 may receive security information 234 from multiple client entities 104 in parallel and provide security information 234 to other client entities 104 in parallel, thus enabling the security agents 216 of the client entities 104 forming a group to operate in parallel with respect to each other using the latest security information 234 provided by any member of the group.

In some embodiments, the sharing module 240 may retrieve security information 234 from third party security services 206 and automatically share such security information 234 with client entities. The sharing module 240 may also share security information 234 received from client entities 104 with third party security services 206 or with third party security products 220.

In some embodiments, the security module 242 may be any one or more applications, processes, threads, algorithms or modules capable of being executed by a processor that utilizes keys, hashing, certificates from a certificate authority, an identity verification mechanism or other security features used to secure communications between the security service 102 and client entities 104 and between the client entities 104. Such keys, hashing, certificates from a certificate authority, an identity verification mechanism or other security features may prevent identity spoofing and frustrate interception and decoding of communications. These security features may also prevent the security service 102, other client entities 104 not belonging to the group, or other parties from viewing the shared security information.

In various embodiments, the rating module 244 may be any one or more applications, processes, threads, algorithms or modules capable of being executed by a processor to associate a client entity 104 with one or both of a rating or a point currency. The rating module 244 may provide the rating or point currency to the web server 228 for display to other client entities 104, enabling the other client entities 104 to affect the rating or point currency for the client entity 104. For example, if the rating is a number of stars (e.g., anywhere from zero to five), the rating module 244 may provide a current rating (e.g., four stars) and enable another client entity 104 to provide a rating (e.g., one star) that may be included in an operation that averages the ratings received from the other client entities 104. Such a rating or point currency may be specific to a group or may be system-wide.

In some embodiments, the rating module 244 may also adjust the rating or point currency based on actions taken or refrained from by the client entity 104. For instance, the rating module 244 may add points to the point currency every time the client entity 104 provides security information 234 and may subtract from the point currency every time the client entity 104 consumes security information 234. In another example, the rating module 244 may increase a rating or point currency responsive to a client entity 104 providing further details about itself.

In further embodiments, the reward module 246 may be any one or more applications, processes, threads, algorithms or modules capable of being executed by a processor to associated merit indicia with a client entity 104 based on contributions of the client entity 104 to the system or to a group. Such contributions could include being the first to contribute a specific malicious code, being the first to attribute a specific malicious code, being the first to provide security information related to a specific malicious code, etc. The merit indicia may then be included in the client entity information 230 and optionally displayed on a profile page for the client entity 104.

In some instances, any or all of the security service 102 or the computing devices/mobile devices 208 of the client entities 104 may have features or functionality in addition to those that FIG. 1 illustrates. For example, any or all of the security service 102 or the computing devices/mobile devices 208 of the client entities 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within any or all of the security service 102 or the computing devices/mobile devices 208 of the client entities 104 may reside remotely from that/those device(s), in some implementations.

Example Processes

FIGS. 3-6 illustrate example processes 300, 500, and 600. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
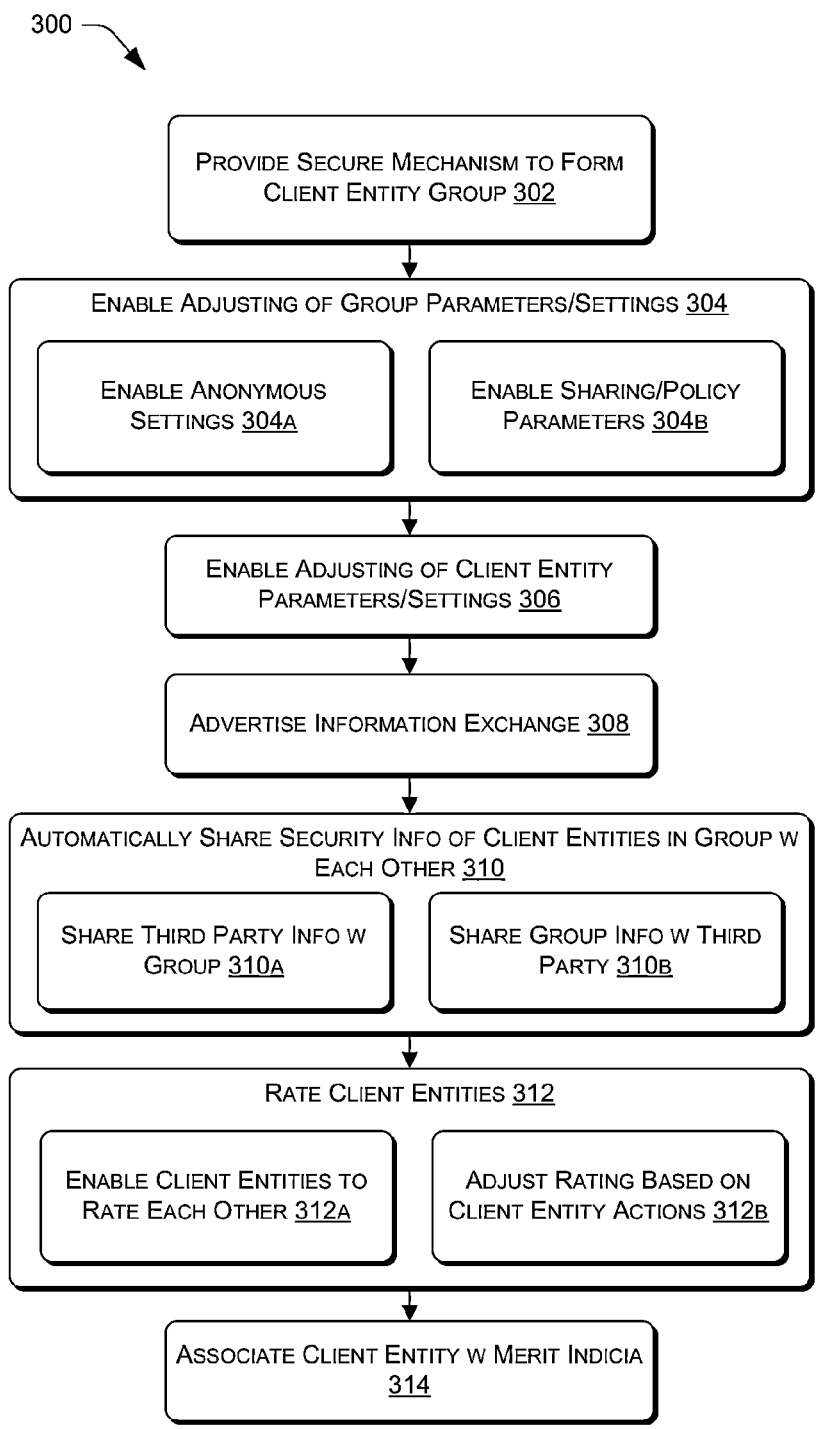
FIG. 3 illustrates an example process implemented by the security service of FIGS. 1a-1b for providing secure mechanisms for forming groups among client entities and for automatically sharing security information among the client entities of a group.

FIG. 3 illustrates an example process implemented by the security service of FIGS. 1A-1B for providing secure mechanisms for forming groups among client entities and for automatically sharing security information among the client entities of a group. The process 300 includes, at 302, providing, by a security service, one or more secure mechanisms for forming a group among client entities. The client entities may receive information security services from the security service.

Figure 4:
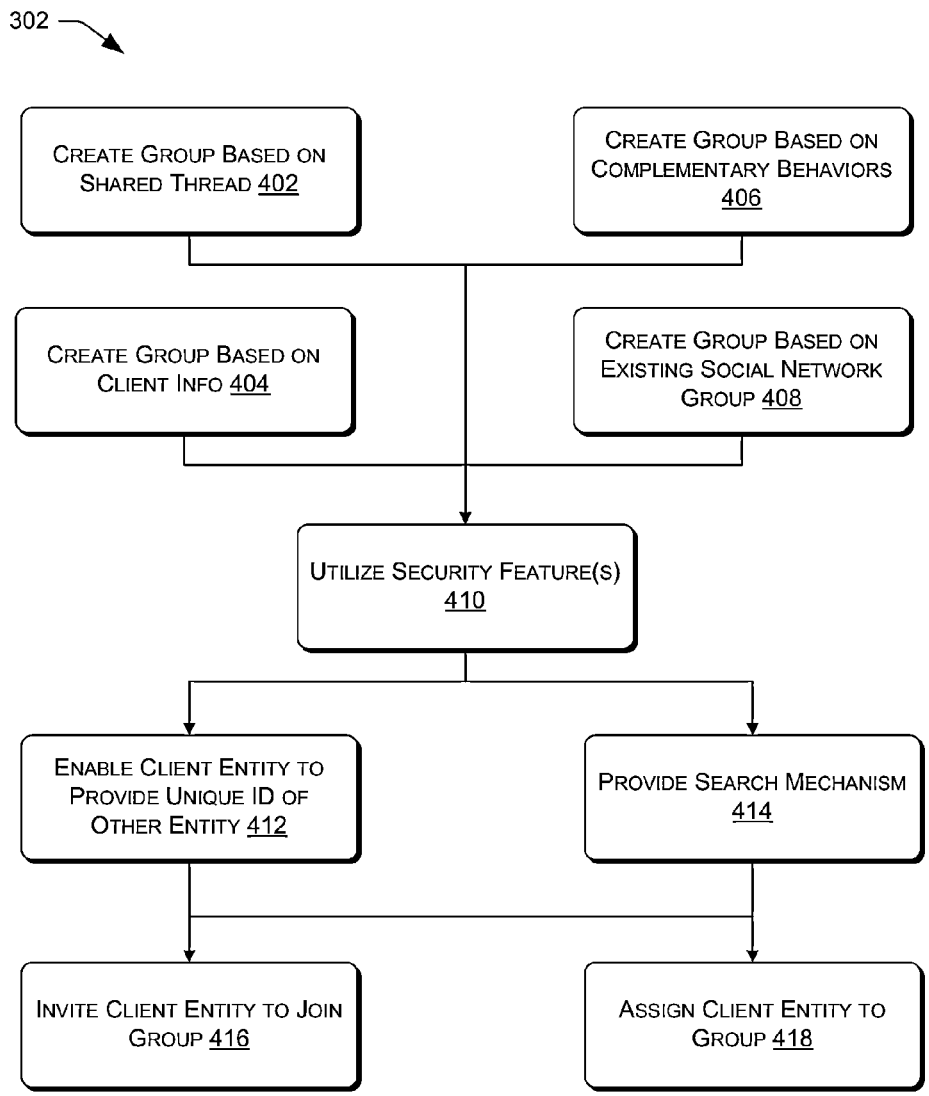
FIG. 4 illustrates in greater detail the providing of secure mechanisms for forming groups among client entities shown in and described with reference to FIG. 3.

The providing at 302 is illustrated in greater detail by operations 402-418 of FIG. 4. At 402, the providing may include creating, by the security service, the group based at least in part on a threat effecting by the client entities. At 404, the security service may create the group based at least in part on client entity information, such as client entity preferences or settings or an industry sector of the client entities, a geographic location of the client entities, a size range of the client entities, or interests of the client entities. At 406, the security service may create the group based at least in part on complementary behaviors of the client entities. At 408, the providing may comprise creating, by the security service, the group based at least in part on an existing social network group.

At 410, the security service may utilize keys, hashing, certificates from a certificate authority, an identity verification mechanism or one or more other security features in providing the secure mechanism for forming groups. Such keys, hashing, certificates from a certificate authority, identity verification mechanisms, or one or more other security features may, for example, prevent identity spoofing.

At 412, the security service may enable client entities to create groups or invite others to join a group by enabling those client entities to identify those to be invited by providing unique identifiers of the other entities. At 414, the security service may enable client entities to create groups or invite others to join a group by providing those client entities with a blind search mechanism. Using the blind search mechanism, the client entities may identify other entities. If those other entities are client entities, they are invited by the security service to join the group.

At 416, the security service may invite client entities to join a group. These client entities may be identified based on association with a threat, with a preference or setting, with an industry sector, a geographic location, a size range, or an interest, or with a set of behaviors, or with a social network group. The client entities may also or instead be identified based on a unique identifier received from another client entity or based on results of a search. At 418, the security service may assign client entities to groups and provide those client entities with an option to subsequently opt out of the groups.

Returning to FIG. 3, at 304, the security service may enable client entities to adjust settings or parameters associated with the groups to which they belong. At 304a, these group settings or parameters may include a setting that allows members of the group to appear anonymous with respect to each other. At 304b, the enabling includes enabling client entities to adjust sharing parameters or policy parameters that are associated with the groups.

At 306, the security service may enable client entities to adjust settings, sharing parameters, or policy parameters associated with those client entities. The settings or parameters may be system-wide or group-based. Such settings, sharing parameters, or policy parameters may provide client entities with granularity control over their information. In some embodiments, the enabling may include providing the client entities with client entity profiles and enabling the client entities to modify their corresponding client entity profiles and to set access restrictions to their corresponding client entity profiles.

At 308, the security service may enable a client entity to advertise security information for sharing in exchange for return security information from the receiving client entities.

At 310, the security service may automatically share security information of a client entity in the group with one or more other client entities in the group. At 310a, the automatic sharing may further include sharing security information received from a third party with client entities belonging to a group. At 310b, the security service may share security information from client entities belonging to a group with a third party product or service.

At 312, the security service may associate a rating with a client entity, the rating indicative of the client entity's participation in a group of client entities. At 312a, the security service may enable at least one client entity in the group of client entities to affect a rating of another client entity. At 312b, the security service may adjust the rating based on actions of the other client entity either taken or refrained from with respect to sharing security information with one or more client entities in the group of client entities.

At 314, the security service may associate one or more of the client entities with merit indicia based at least in part on contributions of the one or more client entities to a security ecosystem of the security service or to the group.

Figure 5:
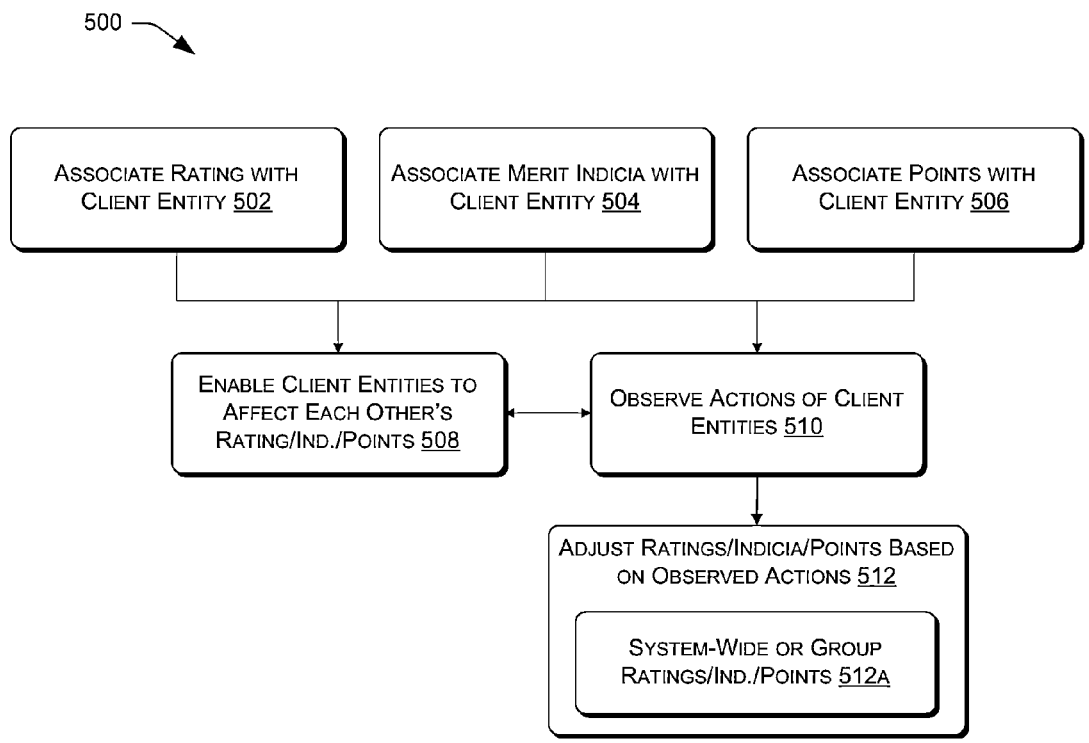
FIG. 5 illustrates an example process implemented by the security service of FIGS. 1A-1B for associating a rating with a client entity, for enabling other members of a group including the client entity to affect the rating, and for adjusting the rating based on actions taken or refrained from by the client entity.

FIG. 5 illustrates an example process implemented by the security service of FIGS. 1A-1B for associating a rating with a client entity, for enabling other members of a group including the client entity to affect the rating, and for adjusting the rating based on actions taken or refrained from by the client entity. The process 500 includes, at 502, associating, by the security service, a rating with a client entity, the rating indicative of the client entity's participation in a group of client entities that share security information with one another. Alternatively or additionally, at 504, the security service may associate one or more of the client entities with merit indicia based at least in part on contributions of the one or more client entities to a security ecosystem of the security service or to the group. Further, alternatively or additionally, at 506, the security service may associate a point currency with a client entity.

At 508, the security service may enable at least one client entity in the group of client entities to affect a rating or point currency of another client entity or affect an awarding of merit indicia.

At 510, the security service may observe actions taken or refrained from by client entities with respect to sharing security information with one or more client entities in the group of client entities. At 512, the security service may adjust a rating, merit indicia, or a point currency based on the observed actions taken or refrained from. At 512a, the rating, merit indicia, or point currency may be system-wide or specific to a group.

Figure 6:
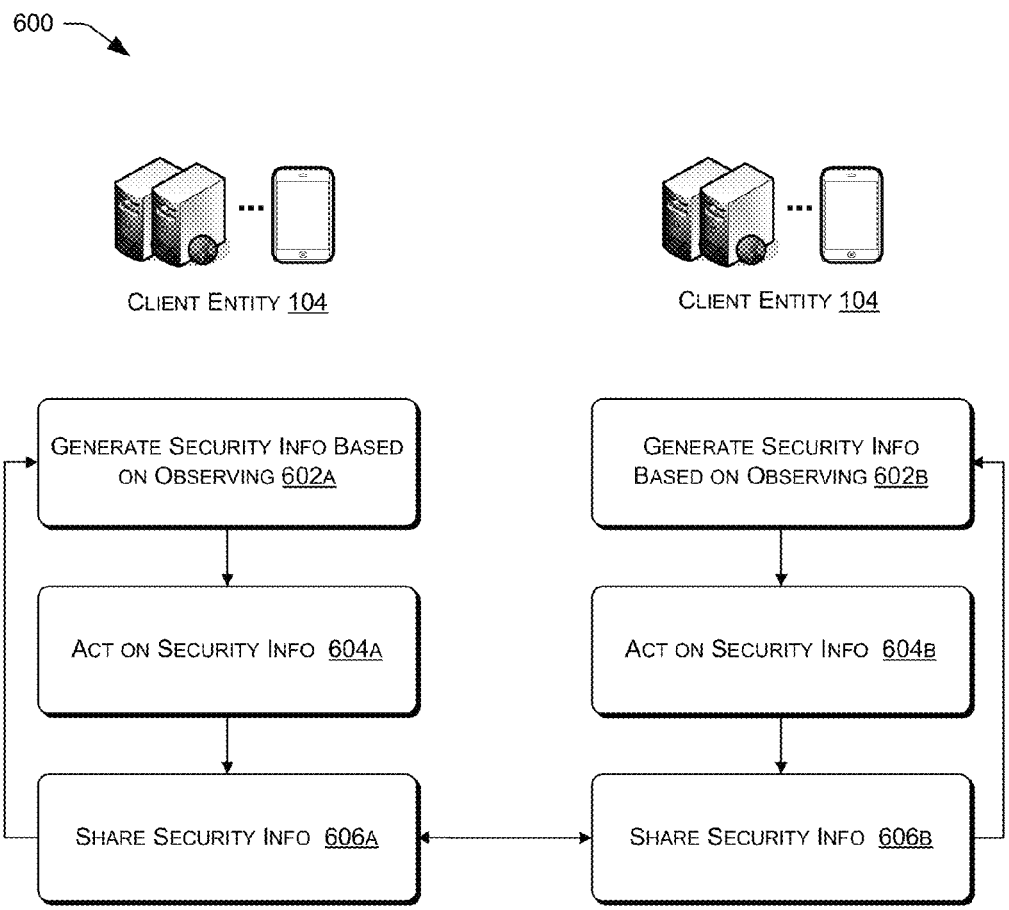
FIG. 6 illustrates an example process implemented by client entities of FIGS. 1A-1B for generating security information based on execution activities, for acting upon the generated security information, and for sharing the generated security information with other client entities belonging to a same group.

FIG. 6 illustrates an example process implemented by client entities of FIGS. 1A-1B for generating security information based on execution activities, for acting upon the generated information or policies, and for sharing the generated information or policies with other client entities belonging to a same group. The process 600 includes, at 602a and 602b, agents implemented on computing devices of multiple client entities generating, in parallel, security information based at least in part on observing execution activities of their respective computing devices.

At 604a and 604b, the agents act, in parallel, on their respective security information.

At 606a and 606b, the agents share their respective security information with each other. The agents then repeat the generating act based at least in part on the shared security information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method comprising:
   forming, by a group formation module of security service computing device(s), a group including multiple client entities, each client entity being associated with a different security organization and each client entity having one or more computing devices, each computing device configured with an executable security agent; and automatically sharing, by a sharing module of the security service computing device(s), security information generated by the executable security agent(s) of a client entity in the group with the executable security agent(s) of computing device(s) of one or more other client entities in the group, wherein the security information is generated by the executable security agent(s) of the client entity based on monitoring of execution activities of the computing device(s) of the client entity, wherein the security information is indicative of whether the client entity is experiencing a security threat, and wherein each client entity is able to impose a security scheme or policy on its computing device(s) but is unable to impose the security scheme or policy on computing device(s) of other client entities.

2. The method of claim 1, further comprising enabling a client entity of the multiple client entities to invite another client entity to join the group by providing a unique identifier of the other client entity to the security service.

3. The method of claim 1, further comprising:
providing a blind search mechanism that enables a client entity of the multiple client entities to provide identifying information for an entity to the security service;
determining based at least in part on the identifying information whether the entity is a client entity; and
in response to determining that the entity is a client entity, inviting the entity to join the group.

4. The method of claim 3, wherein the inviting is performed conditionally based on whether the entity has performed a blind search for the searching client entity.

5. The method of claim 1, further comprising:
enabling a client entity of the multiple client entities to search for other client entities and to receive, in return, a list of client entities matching a search query; and
enabling the searching client entity to invite one or more of the client entities included in the list of client entities to join or form a group with the searching client entity.

6. The method of claim 1, further comprising inviting client entities associated with a security threat to join the group.

7. The method of claim 1, wherein the forming further comprises creating the group and inviting the client entities to join the group based at least in part on preferences specified by the client entities.

8. The method of claim 1, wherein the forming further comprises creating the group and associating the group with at least one of an industry sector of the client entities, a geographic location of the client entities, a size range of the client entities, or interests of the client entities.

9. The method of claim 8, further comprising inviting the client entities to join the group or opening the group to the public.

10. The method of claim 8, further comprising assigning the client entities to the group and providing the client entities with an option to opt out of the group.

11. The method of claim 1, wherein the forming further comprises creating the group based at least in part on complementary behaviors of the client entities.

12. The method of claim 1, wherein the forming further comprises creating the group based at least in part on one or more social network groups.

13. The method of claim 1, wherein the group is associated with a setting that allows the client entities to be anonymous with respect to each other.

14. The method of claim 1, wherein the group is associated with a trusted moderator or group of moderators who controls admission to the group.

15. The method of claim 1, further comprising enabling one or more of the client entities of the group to specify sharing parameters and policy parameters for the group.

16. The method of claim 1, wherein the automatic sharing involves utilizing one or more of keys, hashing, certificates from a certificate authority, an identity verification mechanism, or other security features to prevent identity spoofing and secure the shared security information.

17. The method of claim 1, wherein the shared security information is viewable by the client entity sharing the security information and the client entities receiving the security information and is not viewable by the security service or other parties.

18. The method of claim 1, further comprising enabling a client entity to set system-wide or group-based sharing parameters for the client entity.

19. The method of claim 1, further comprising enabling a client entity to advertise security information for sharing in exchange for security information from another client entity.

20. The method of claim 1, wherein the automatic sharing includes sharing security information from third party sources with the client entities of the group.

21. The method of claim 1, further comprising sharing the security information with a third party security product or service.

22. The method of claim 1, further comprising associating one or more of the client entities with merit indicia based at least in part on contributions of the one or more client entities to a security ecosystem of the security service or to the group.

23. The method of claim 1, further comprising providing the client entities with client entity profiles and enabling the client entities to modify their corresponding client entity profiles and to set access restrictions to their corresponding client entity profiles.

24. The method of claim 1, wherein the security information includes at least one of threat information, remediation information, policies, attack data, vulnerability information, reverse engineering information, packet data, network flow data, protocol descriptions, victim information, threat attribution information, incident information, proliferation data, user feedback, or information on software or systems.

25. The method of claim 1, wherein the security service is a public service open to interested client entities or a private service open to specific client entities.

26. The method of claim 1, further comprising enabling manual sharing of security information between the client entities in the group.

27. The method of claim 1, further comprising providing, to a client entity, an indication of available security information through a user interface and providing the available security information to the client entity responsive to that client entity electing to share security information of the client entity with another client entity that is associated with the available security information.

28. The method of claim 27, wherein the available security information indicated through the user interface is selected for the client entity based on security information possessed or provided by the client entity.

29. The method of claim 1, wherein the group belongs to one or more hierarchies of groups, each hierarchy of groups being associated with access controls to security information or with policies pushed to member client entities.

30. A system comprising:

a plurality of computing devices associated with a plurality of entities, wherein the entities belong to a group of entities that share security information with each other and each entity is associated with a different security organization; and a plurality of security agents respectively implemented on the plurality of computing devices, the security agents observing execution activities of their respective computing devices, generating the security information based on the observed execution activities, sharing the security information with one another, and utilizing the security information in observing or reacting to further execution activities of the computing devices on which they are implemented, wherein the security information is indicative of whether the security agents are experiencing a security threat, and wherein each entity is able to impose a security scheme or policy on its computing device(s) but is unable to impose the security scheme or policy on computing device(s) of other entities.

31. The system of claim 30, further comprising a security service to form the group of entities and to automatically share the security information received from one of the plurality of security agents with the other security agents of the plurality of security agents.

32. The system of claim 30, wherein the security agents observe and react to the execution activities of their respective computing devices in parallel with respect to each other.

* * * * *